(12) United States Patent
Gayle (10) Patent No.: US 11,474,083 B2
(45) Date of Patent: Oct. 18, 2022

(54) METROLOGY QUALIFICATION OF NON-DESTRUCTIVE INSPECTION SYSTEMS

(71) Applicant: The Boeing Company, Chicago, IL (US)

(72) Inventor: David Michael Gayle, Summerville, SC (US)

(73) Assignee: The Boeing Company, Chicago, IL (US)

(*) Notice: Subject to any disclaimer, the term of this patent is extended or adjusted under 35 U.S.C. 154(b) by 373 days.

(21) Appl. No.: 16/733,909

(22) Filed: Jan. 3, 2020

(65) Prior Publication Data

US 2021/0208112 A1   Jul. 8, 2021

(51) Int. Cl.
*G01N 29/44* (2006.01)
*G01N 29/12* (2006.01)

(52) U.S. Cl.
CPC ......... *G01N 29/4436* (2013.01); *G01N 29/12* (2013.01)

(58) Field of Classification Search
CPC ............... G01N 29/4436; G01N 29/12; G01N 2291/0289; G01N 29/04; G01N 29/4409; G01N 29/4463; G01N 29/46; G01N 29/30; G01N 2291/028; G01N 29/44; G01N 29/045; G01N 29/24
See application file for complete search history.

(56) References Cited

U.S. PATENT DOCUMENTS

| 7,216,544 B2* | 5/2007 | Vaccaro ................. B33Y 80/00 73/620 |
| 8,522,615 B1 | 9/2013 | Brady et al. |
| 8,874,384 B1 | 10/2014 | Brady et al. |
| 9,804,130 B2* | 10/2017 | Tat .......................... G01N 15/08 |
| 2002/0066318 A1 | 6/2002 | Dubois et al. |
| 2011/0232360 A1 | 9/2011 | Deangelo et al. |

(Continued)

FOREIGN PATENT DOCUMENTS

WO   2019075347 A1   4/2019

OTHER PUBLICATIONS

Extended European Search Report dated Apr. 8, 2021 for European Patent Application No. 20207324.3, 9 pages.

*Primary Examiner* — Xin Y Zhong
(74) *Attorney, Agent, or Firm* — Sage Patent Group (57) ABSTRACT

A method for performing metrology qualification of a non-destructive inspection (NDI) ultrasonic system includes performing, by the NDI ultrasonic system, an ultrasonic scanning operation on a calibration coupon. The ultrasonic scanning operation generates a scan signal. The method also includes superimposing a time-domain qualification mask on the scan signal and determining whether the scan signal is within the time-domain qualification mask. The method also includes validating a porosity sensitivity of the NDI ultrasonic system using a frequency-domain qualification mask. The method additionally includes qualifying the NDI ultrasonic system in response to the scan signal being within the time-domain qualification mask for a portion of the calibration coupon without a defect and the scan signal being above the time-domain qualification mask for another portion of the calibration coupon including the defect, and the porosity sensitivity of the NDI ultrasonic system being validated.

20 Claims, 8 Drawing Sheets

(56) References Cited

U.S. PATENT DOCUMENTS

| | | |
|---|---|---|
| 2013/0031979 A1 | 2/2013 | Bergman |
| 2016/0131557 A1* | 5/2016 | Bossi ...................... B29C 59/16 73/1.89 |
| 2016/0209375 A1 | 7/2016 | Yamaoka |

* cited by examiner

METROLOGY QUALIFICATION OF NON-DESTRUCTIVE INSPECTION SYSTEMS

FIELD

The present disclosure relates to non-destructive inspection (NDI) systems and more particularly to a method and system for metrology qualification of NDI ultrasonic systems.

BACKGROUND

NDI ultrasonic inspection systems are qualified through empirical methods which use NDI reference standards to calibrate and qualify the NDI ultrasonic inspection system. This empirical method has a low first pass quality rate due to the physical reference standards and NDI ultrasonic system variability. Every NDI ultrasonic inspection qualification is custom. Linear array transducers for an NDI ultrasonic inspection system can cost from $5,000 to $10,000 each and are custom made. Suppliers for these systems are limited and the lead time for development can be over a year. Improved methods and systems for qualification of NDI inspection systems is needed.

SUMMARY

In accordance with an example, a method for performing metrology qualification of a non-destructive inspection (NDI) ultrasonic system and/or an NDI ultrasonic transducer includes performing, by the NDI ultrasonic system, an ultrasonic scanning operation on a calibration coupon. The ultrasonic scanning operation generates a scan signal. The method also includes superimposing a time-domain qualification mask on the scan signal and evaluating the scan signal using the time-domain qualification mask. The method additionally includes validating a porosity sensitivity of the NDI ultrasonic system and/or the NDI ultrasonic transducer using a frequency-domain qualification mask. The method further includes qualifying the NDI ultrasonic system and/or the NDI ultrasonic transducer in response to the scan signal being below the time-domain qualification mask for a portion of the calibration coupon without a defect and the scan signal being above the time-domain qualification mask for another portion of the calibration coupon including the defect, and the porosity sensitivity of the NDI ultrasonic system being validated.

In accordance with another example, a system for performing metrology qualification of a non-destructive inspection (NDI) ultrasonic system and/or an NDI ultrasonic transducer includes a processor and a memory associated with the processor. The memory includes computer-readable program instructions that, when executed by the processor causes the processor to perform a set of functions. The set of functions include performing an ultrasonic scanning operation on a calibration coupon. The ultrasonic scanning operation generates a scan signal. The set of functions also include superimposing a time-domain qualification mask on the scan signal and evaluating the scan signal using the time-domain qualification mask. The set of functions also includes validating a porosity sensitivity of the NDI ultrasonic system using a frequency-domain qualification mask. The set of functions further include qualifying the NDI ultrasonic system in response to the scan signal being within the time-domain qualification mask for a portion of the calibration coupon without a defect and the scan signal being above the time-domain qualification mask for another portion of the calibration coupon including the defect, and the porosity sensitivity of the NDI ultrasonic system being validated.

In accordance with an example and any of the preceding examples, the method and system also include calibrating at least one of the NDI ultrasonic system or the NDI ultrasonic transducer of the NDI ultrasonic system in response to the scan signal being above the time-domain qualification mask for any of the portion of the calibration coupon without the defect or the scan signal being below the time-domain qualification mask for any of the other portion of the calibration coupon including the defect. The method and system further include repeating: the performing the ultrasonic scanning operating to generate a new scan signal, the superimposing the time-domain qualification mask on the new scan signal, the evaluating the new scan signal using the time-domain qualification mask, and the at least one of calibrating the NDI ultrasonic system or the NDI ultrasonic transducer until the new scan signal is below the time-domain qualification mask for the portion of the calibration coupon without the defect and the new scan signal is above the time-domain qualification mask for the other portion of the calibration coupon comprising the defect.

In accordance with an example and any of the preceding examples, the method and system further include calibrating at least one of the NDI ultrasonic system or the NDI ultrasonic transducer of the NDI ultrasonic system in response to the porosity sensitivity of the NDI ultrasonic system not being validated. The system and method additionally include repeating: the performing the ultrasonic scanning operation to generate a new scan signal, verifying the new scan signal passes the time-domain qualification mask, and the calibrating at least one of the NDI ultrasonic system or the NDI ultrasonic transducer of the NDI ultrasonic system until the porosity sensitivity of the NDI ultrasonic system is validated.

In accordance with an example and any of the preceding examples, wherein the scan signal is an A-scan ultrasonic signal.

In accordance with an example and any of the preceding examples, wherein the method and system further include creating the time-domain qualification mask using at least one of a specification for a workpiece and process specification requirements. The time-domain qualification mask is configured for testing a noise floor, a depth of the calibration coupon, and a signal sensitivity for different types of defects.

In accordance with an example and any of the preceding examples, wherein the different types of defects include a void, a delamination, and an inclusion.

In accordance with an example and any of the preceding examples, wherein the method and system further include performing a validation of the time-domain qualification mask.

In accordance with an example and any of the preceding examples, wherein performing the validation of the time-domain qualification mask includes generating a C-scan signal by performing an ultrasonic scanning operation on a metrology coupon; selecting an A-scan signal from the C-scan signal; and drawing the time-domain qualification mask around the A-scan signal.

In accordance with an example and any of the preceding examples, wherein validating the porosity sensitivity of the NDI ultrasonic system and/or the NDI ultrasonic transducer includes predicting a system response of the NDI ultrasonic system by Fast Fourier Transform (FFT), dynamic range, and noise floor testing and evaluation; presenting a plurality of different material types for selection; and creating a porosity sensitivity curve for the selected material using the frequency-domain qualification mask.

In accordance with an example and any of the preceding examples, wherein the method and system further include creating the frequency-domain qualification mask for a particular workpiece.

In accordance with an example and any of the preceding examples, wherein creating the frequency-domain qualification mask for the particular workpiece includes generating an ultrasonic signal by performing an ultrasonic scanning operation on a metrology coupon; converting the ultrasonic signal from a time domain signal to a frequency domain signal; and applying a bandwidth mask that covers the frequency domain signal.

In accordance with an example and any of the preceding examples, wherein the system and method further include verifying that the frequency domain signal is completely within the bandwidth mask; and applying a notch filter or using a different transducer so that the frequency domain signal is completely within the bandwidth mask in response to a portion of the frequency domain signal being outside of the bandwidth mask, wherein the bandwidth mask with the frequency domain signal completely within the bandwidth mask corresponds to the frequency-domain qualification mask.

In accordance with an example and any of the preceding examples, wherein applying the bandwidth mask comprises the bandwidth mask being less than or equal to about fifty percent (50%) of a peak amplitude of the frequency domain signal.

In accordance with an example and any of the preceding examples, wherein validating the porosity sensitivity of the NDI ultrasonic system is based on a thickness of the calibration coupon, a frequency of the NDI ultrasonic transducer of the NDI ultrasonic system and a bandwidth of a frequency domain signal.

The features, functions, and advantages that have been discussed can be achieved independently in various examples or may be combined in yet other examples further details of which can be seen with reference to the following description and drawings.

DETAILED DESCRIPTION

The following detailed description of examples refers to the accompanying drawings, which illustrate specific examples of the disclosure. Other examples having different structures and operations do not depart from the scope of the present disclosure. Like reference numerals may refer to the same element or component in the different drawings.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 1A:
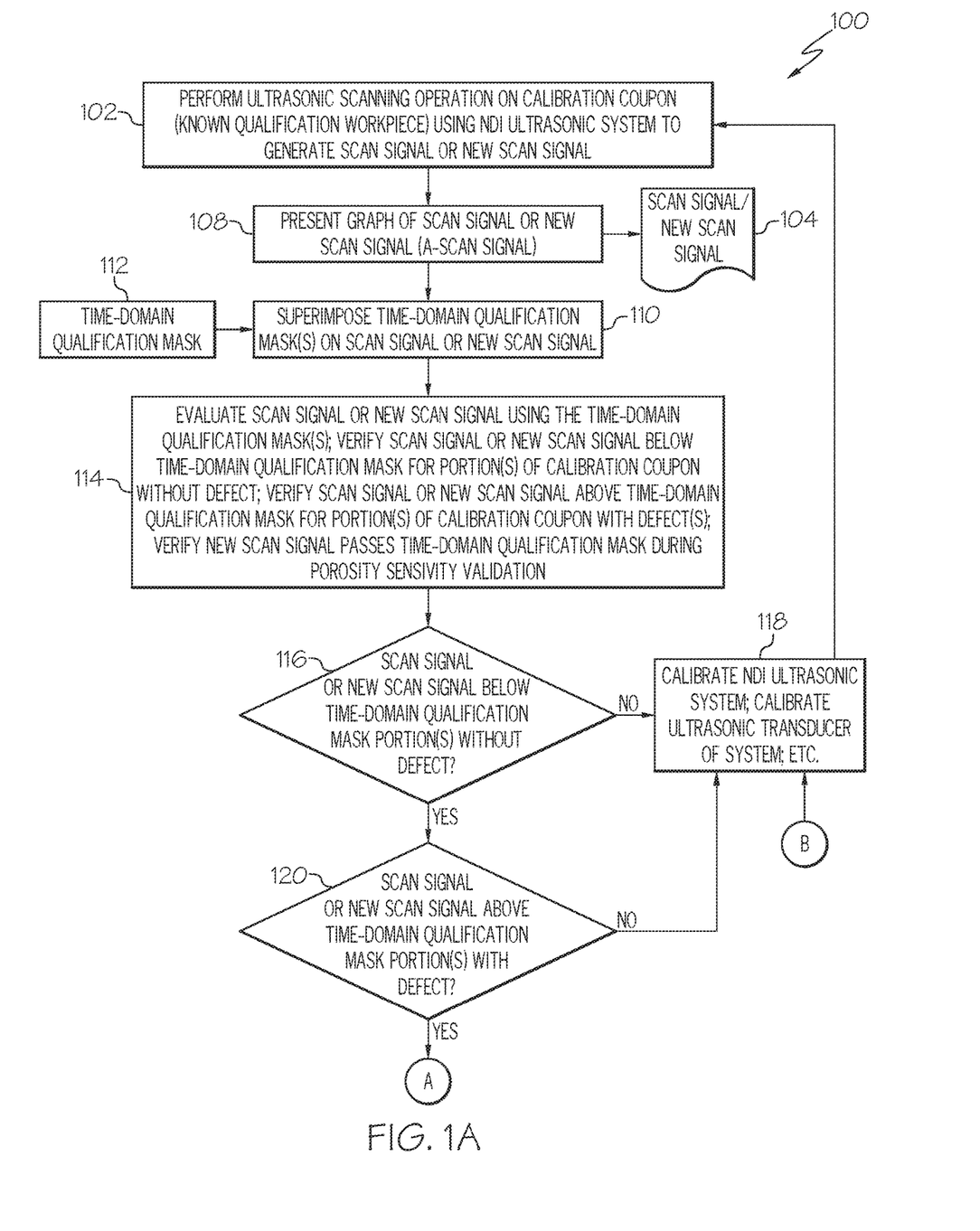
FIGS. 1A and 1B are a flow chart of an example of a method for performing metrology qualification of an NDI ultrasonic system and/or an NDI ultrasonic transducer in accordance with an example of the present disclosure.
Figure 1B:
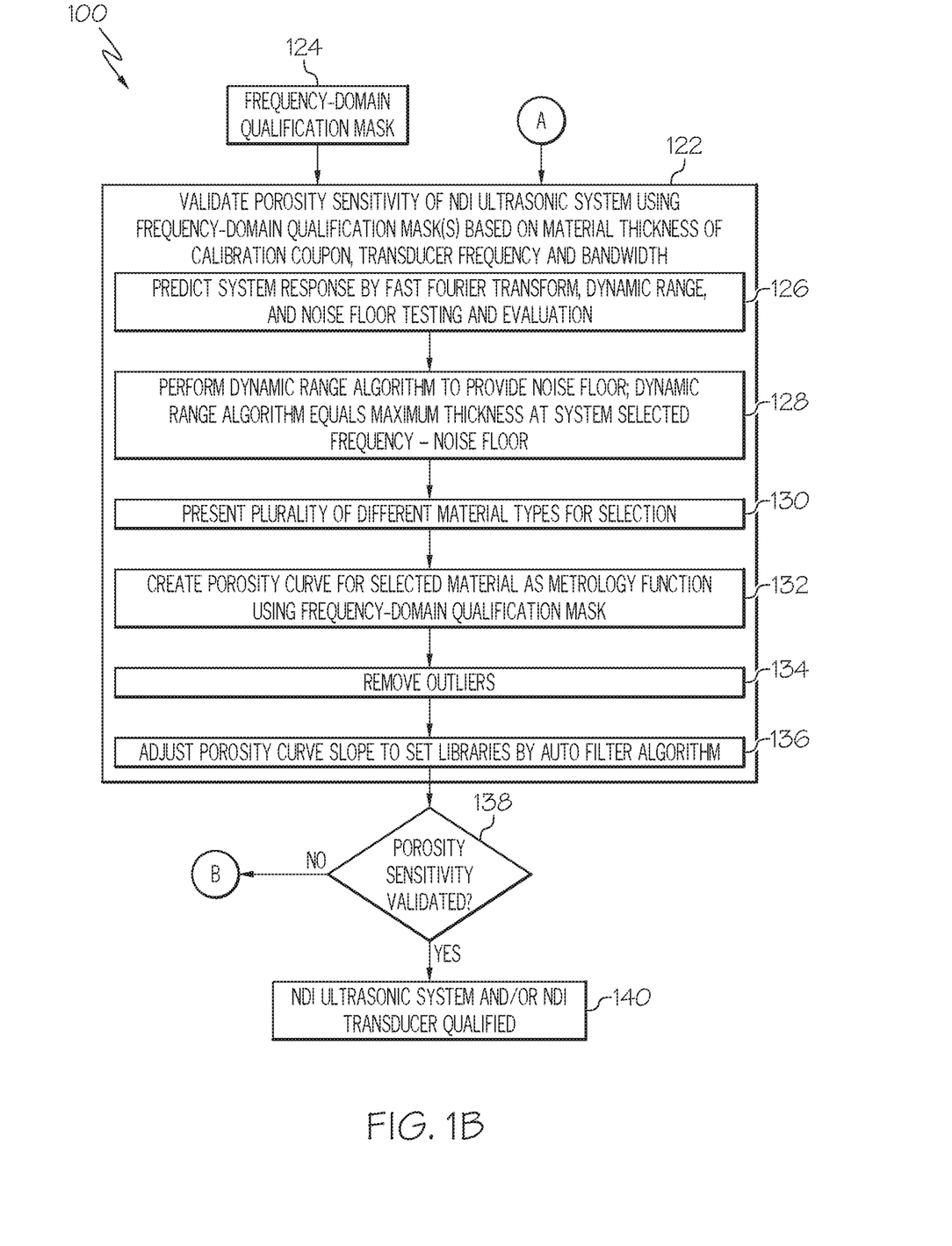
Figure 2:
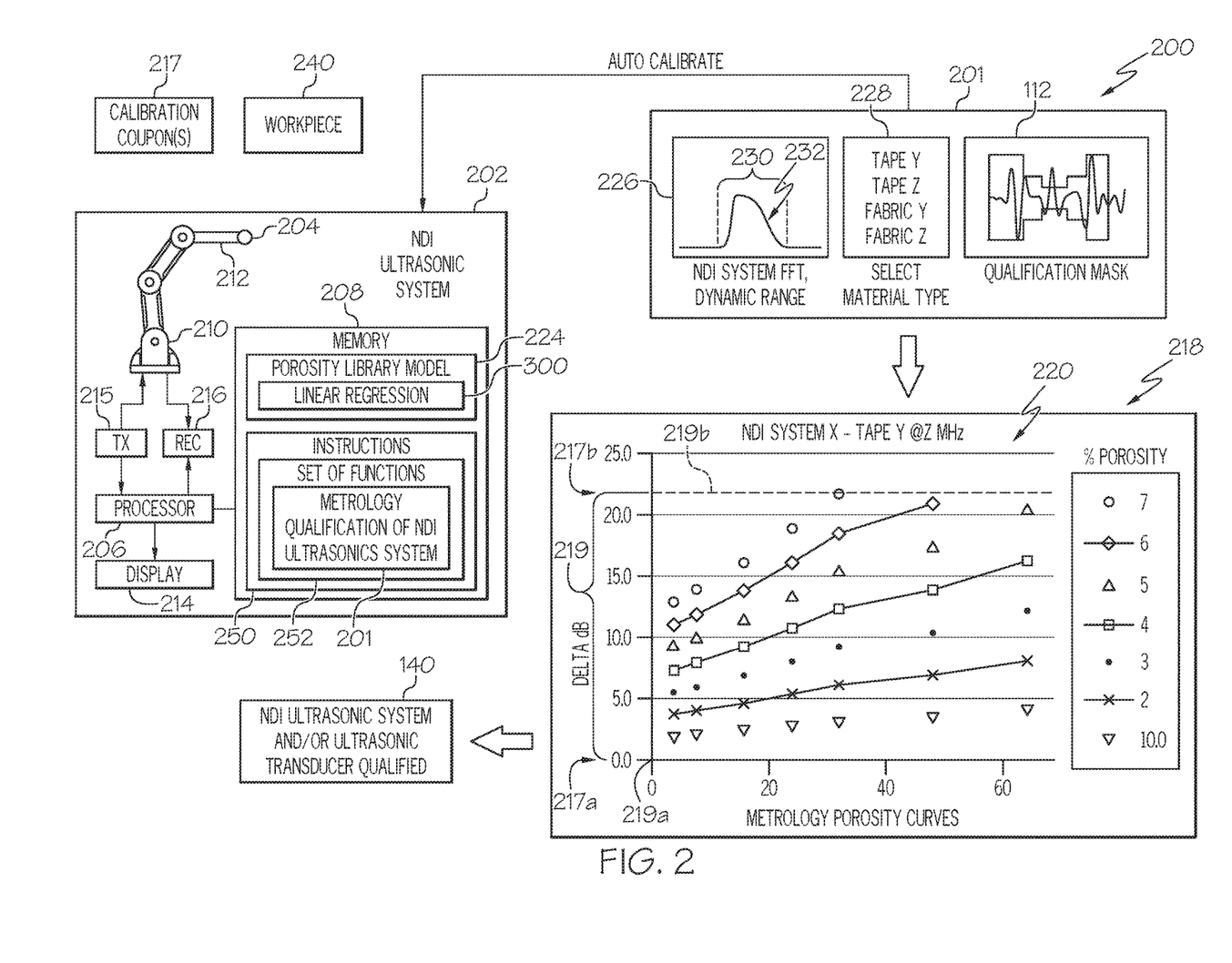
FIG. 2 is an illustration of an example of a smart metrology system for performing metrology qualification of an NDI ultrasonic system and/or an NDI ultrasonic transducer in accordance with the exemplary method in FIGS. 1A and 1B.

FIGS. 1A and 1B are a flow chart of an example of a method 100 for performing metrology qualification of an NDI ultrasonic system and/or an NDI ultrasonic transducer in accordance with an example of the present disclosure. Referring also to FIG. 2, FIG. 2 is an illustration of an example of a smart metrology system 200 for performing metrology qualification 201 of an NDI ultrasonic system 202 and/or an NDI ultrasonic transducer 204 in accordance with the exemplary method in FIGS. 1A and 1B. In accordance with an example, the NDI ultrasonic system 202 includes a processor 206 and a memory 208 associated with the processor 206. The processor 206 is configured to control a robot 210 to perform ultrasonic scanning operations. The robot 210 includes an end effector 212 that is configured to hold the NDI ultrasonic transducer 204 to perform ultrasonic scanning operations as described herein. The processor 206 is also connected to a display 214 for presenting the results of the ultrasonic scanning inspection operations and qualification of the NDI ultrasonic system 202 and/or an NDI ultrasonic transducer 204. The NDI ultrasonic system 202 also incudes a transmitter 215 for transmitting ultrasonic signals and a receiver 216 for receiving return signals or scan signals 104 (FIG. 1A). In accordance with an example, the scan signal 104 is an A-scan signal.

Figure 6:
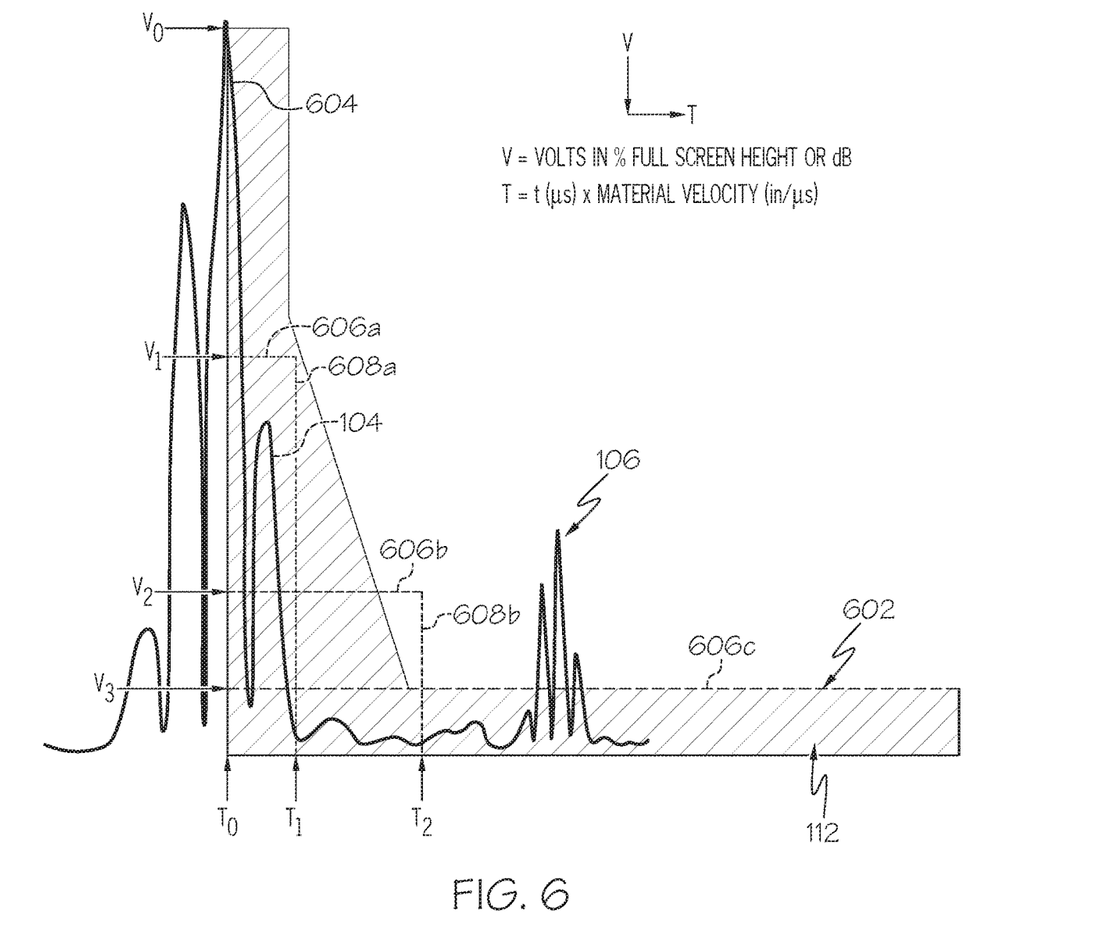
FIG. 6 is an illustration of an example of a time-domain qualification mask in accordance with an example of the present disclosure.

In block 102 of FIG. 1A, an ultrasonic scanning operation is performed on a calibration coupon 217 by the NDI ultrasonic system 202. In accordance with an example, the calibration coupon 217 is a composite material panel including multiple layers of laminated composite materials. In other examples, layers of different types of materials, such as a layer of a metal or alloy may be included in the composite material panel. The calibration coupon 217 includes one or more portions without any defects and one or more portions with a defect 106 (FIG. 6). This is to validate that the NDI ultrasonic system 202 and/or the NDI ultrasonic transducer 204 can accurately detect where there are defects 106 and where there are no defects as described in more detail herein. Examples of defects 106 include but are not necessarily limited to a void, a delamination, and an inclusion, for example, a foreign object or foreign object damage (FOD) in the calibration coupon 217. The ultrasonic scanning operation generates a scan signal 104 or return signal from the calibration coupon 217.

In block 108, a graph of the scan signal 104 is presented. In accordance with an example, the scan signal 104 is presented on a display, such as the display 214 in FIG. 2.

In block 110, a time-domain qualification mask 112 is superimposed on the scan signal 104. Referring also to FIG. 6, FIG. 6 is an illustration of an example of a time-domain qualification mask 112 superimposed on a scan signal 104 in accordance with an example of the present disclosure. Creating the time-domain qualification mask 112 and performing validation of the time-domain qualification mask 112 will be described in more detail with reference to FIGS. 5 and 6.

In block 114, the scan signal 104 is evaluated using the time-domain qualification mask 112. Evaluating the scan signal 104 using the time-domain qualification mask 112 includes verifying that the scan signal 104 is below the time-domain qualification mask 112 for a portion of the calibration coupon 217 where there is no defect 106 and verifying that the scan signal 104 is above the time-domain qualification mask 112 for another portion of the calibration coupon 217 where there is a defect 106 as illustrated in the example in FIG. 6.

In block 116, a determination is made whether the scan signal 104 is below the time-domain qualification mask 112 for the portion of the calibration coupon 217 without a defect 106. If the scan signal 104 is above the time-domain qualification mask 112 for the portion of the calibration coupon 217 without a defect 106, the method 100 advances to block 118. If the scan signal 104 is below the time-domain qualification mask 112 for the portion of the calibration coupon 217 without a defect 106, the method 100 advances to block 120.

In block 120, a determination is made whether the scan signal 104 is above the time-domain qualification mask 112 for another portion of the calibration coupon 217 that includes a defect 106. If the scan signal 104 is above the time-domain qualification mask 112, the method 100 advances to block 122 in FIG. 1B. If the scan signal 104 is below the time-domain qualification mask 112 for the other portion of the calibration coupon 217 that includes a defect 106, the method 100 advances to block 118.

In block 118, at least one of the NDI ultrasonic system 202 and/or the NDI ultrasonic transducer 204 of the NDI ultrasonic system 202 is calibrated in response to the scan signal 104 being above the time-domain qualification mask 112 for any of the portion of the calibration coupon 217 without a defect 106, or the scan signal 104 being below the time-domain qualification mask 112 for any of the other portion of the calibration coupon 217 that includes a defect 106.

From block 118, the method 100 returns to block 102 and another ultrasonic scanning operation is performed by the calibrated NDI ultrasonic system 202 to generate a new scan signal 104. Blocks 102-120 of the method 100 are repeated similar to that previously described until a new scan signal 104 is generated that passes the time-domain qualification mask 112, e.g., the new scan signal 104 is below the time-domain qualification mask 112 for any portion of the calibration coupon 217 without a defect 106, and the new scan signal 104 is above the time-domain qualification mask 112 for the other portion of the calibration coupon 217 that includes a defect 106. Performing the ultrasonic scanning operation to generate the new scan signal 104 in block 102; superimposing the time-domain qualification mask 112 on the new scan signal 104 in block 110; and at least one of calibrating the NDI ultrasonic system 202 and/or the NDI ultrasonic transducer 204 in block 118 are repeated until a new scan signal 104 is generated that passes the time-domain qualification mask 112.

The method 100 advances to block 122 in FIG. 1B in response to the scan signal 104 or new scan signal 104 being below the time-domain qualification mask 112 for the portion of the calibration coupon 217 without a defect 106 in block 116, and in response to the scan signal 104 or new scan signal 104 being above the time-domain qualification mask 112 for the portion of the calibration coupon 217 with a defect 106 in block 120.

In block 122, a porosity sensitivity 218 (FIG. 2) of the NDI ultrasonic system 202 and/or the NDI ultrasonic transducer 204 are validated using a frequency-domain qualification mask 124 and a linear regression model 300 (FIG. 3) of slope M that corresponds to an equation $Y=Mx+b$. In an example of a porosity sensitivity curve 302 illustrated in FIG. 3, a slope of zero ($Y=0x$) indicates no sensitivity to porosity in a range of thickness of a calibration coupon 217 from zero (0) plies to about sixty (60) plies 303. Validating the porosity sensitivity 218 of the NDI ultrasonic system 202 is based on a thickness of the calibration coupon 217, a frequency of the NDI ultrasonic transducer 204 of the NDI ultrasonic system 202 and a bandwidth 230 of a frequency domain signal 232.

As described in more detail with reference to blocks 126-138, the porosity sensitivity 218 is determined by analyzing slopes of a set of metrology porosity curves 220 and an R square value 306 (FIG. 3) to determine how well the set of metrology porosity curves 220 fit a linear regression model 300 of a porosity library model 224. The metrology porosity curves 220 are also referred to as porosity sensitivity curves. In accordance with an example, the porosity library model 224 is internally stored in the memory 208 by the NDI ultrasonic system 202.

Figure 4A:
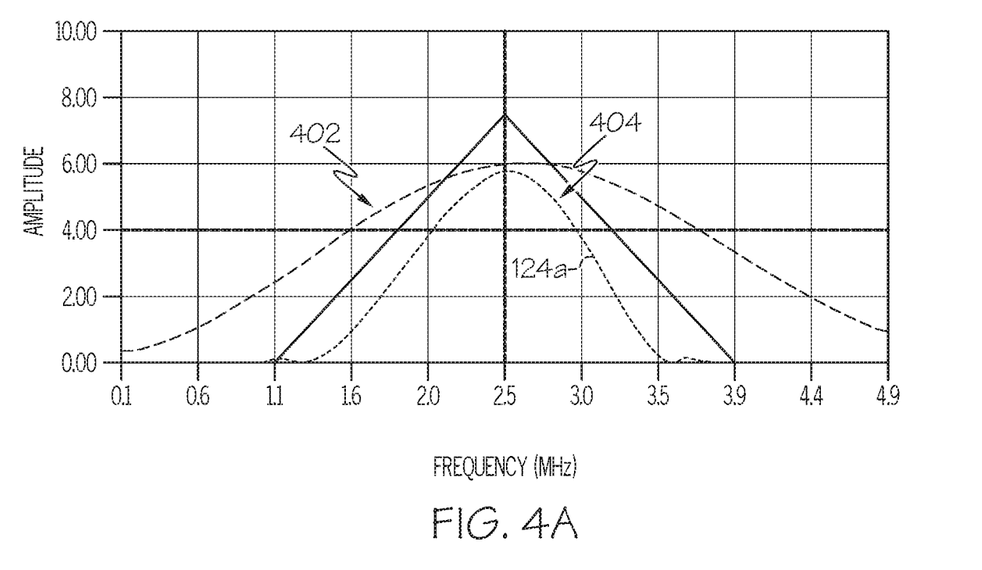
FIG. 4A is an example of a frequency-domain qualification mask for validating porosity sensitivity of an NDI ultrasonic system and/or an NDI ultrasonic transducer before lower frequency component filtering in accordance with an example of the present disclosure.
Figure 4B:
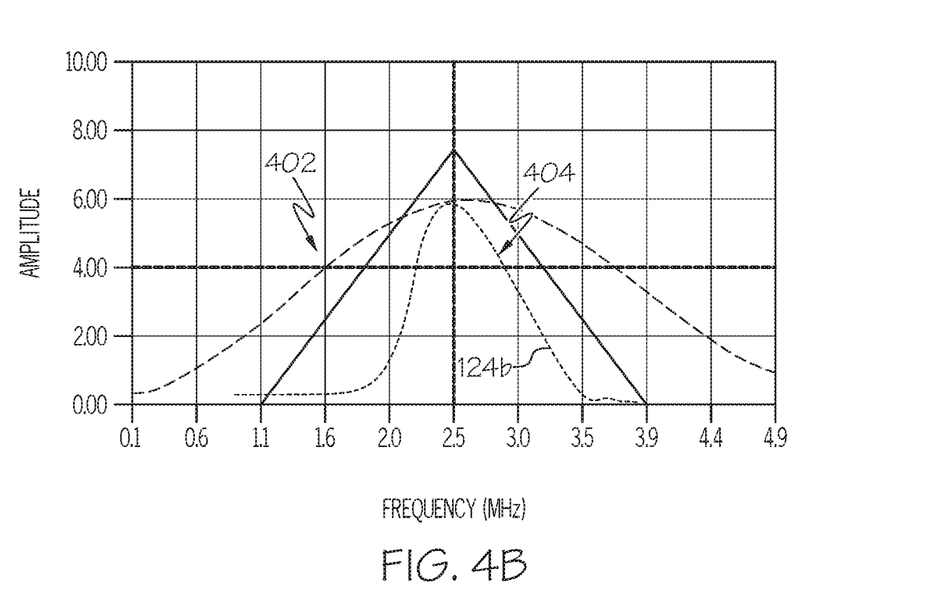
FIG. 4B is an example of a frequency-domain qualification mask for validating porosity sensitivity of an NDI ultrasonic system and/or an NDI ultrasonic transducer after lower frequency component filtering in accordance with an example of the present disclosure.

An example of a frequency-domain qualification mask 124 is illustrated in each of FIGS. 4A and 4B. FIG. 4A is an example of a frequency-domain qualification mask 124a for validating porosity sensitivity 218 of an NDI ultrasonic system 202 and/or an NDI ultrasonic transducer 204 before lower frequency component filtering in accordance with an example of the present disclosure. FIG. 4B is an example of a frequency-domain qualification mask 124b for validating porosity sensitivity 218 of an NDI ultrasonic system 202 and/or an NDI ultrasonic transducer 204 after lower frequency component filtering in accordance with an example of the present disclosure. An example of creating a frequency-domain qualification mask 124 will be described in more detail with reference to FIG. 7.

In block 126, validating the porosity sensitivity 218 of the NDI ultrasonic system 202 and/or the NDI ultrasonic transducer 204 includes predicting a system frequency response 226 (FIG. 2) of the NDI ultrasonic system 202 by Fast Fourier Transform (FFT), and includes dynamic range 219 (FIG. 2) and noise floor 219b and 602 (FIG. 6) testing and evaluation.

In block 128, a dynamic range algorithm is performed on the frequency response 226 to provide the decibel range or dynamic range 219 between saturation 219a and a noise floor 219b and 602. The dynamic range algorithm is validated against a thinnest calibration coupon 217a and a maximum thickness coupon 217b at a selected frequency. The signal from the maximum thickness coupon 217b will be above the noise floor 219b and 602. Passing the frequency-domain qualification mask 124 will require either a proper selection of an ultrasonic transducer 204 with a narrow frequency band to provide a frequency response 226 or scan signal 104 that fits within the frequency-domain qualification mask 124, or by applying a notch software filter or by placing a physical filter in line with a receiver 216 of the NDI ultrasonic system 202 to provide a frequency response 226 that fits within the frequency-domain qualification mask 124. The dynamic range 219 test will be determined based on the generated metrology porosity curves 220 which are frequency and thickness dependent. The noise floor 219b and 602 is tested against the time-domain qualification mask 112 as illustrated in FIG. 6. The noise floor 219b and 602 is determined by the scan signal 104 within the frequency-domain qualification mask 124 attributed to electrical noise or inner ply noise or both as illustrated in FIG. 6.

Figure 3:
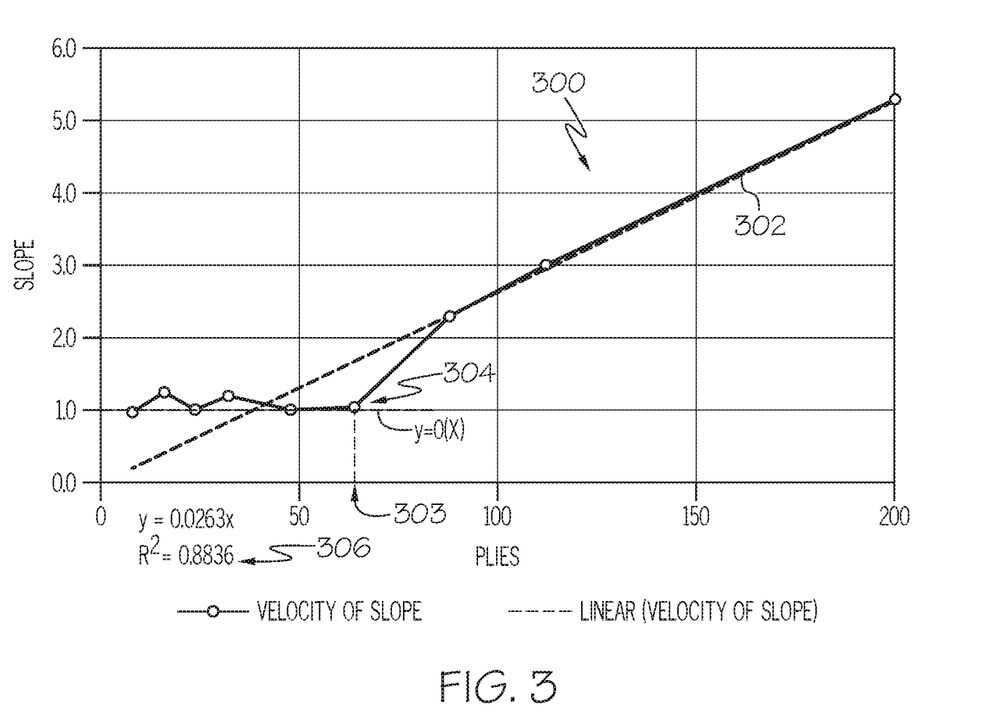
FIG. 3 is an example of validation of a linear regression model of an NDI ultrasonic system in accordance with an example of the present disclosure.

In block 130, a plurality of different material types 228 (FIG. 2) are presented for selection. In block 132, a porosity sensitivity curve 302 (FIG. 3) is created for the selected material type 228 using the frequency-domain qualification mask 124. In block 134, outliers 304 are removed from the porosity sensitivity curve 302. Referring also to FIG. 3, FIG. 3 is an example of validation of a linear regression model 300 of an NDI ultrasonic system in accordance with an example of the present disclosure. FIG. 3 illustrates an example of removing outliers 304 from a porosity sensitivity curve 302. The smart metrology system 200 is configured to analyze slopes of the set of metrology porosity curves 220 and an R square value 306 to determine how well the porosity sensitivity curve 302 fits to a linear regression model 300 of a porosity library model 224. A predetermined slope and R square value 306 will drive the outliers 304 to be removed and filter a frequency spectra until a proper porosity sensitivity 218 is achieved. In accordance with an example, the slope and R square values 306 of porosity sensitivity curves 302 for a porosity library model 224 are empirically determined based on material types and optimized for the best system response. In accordance with another example, the slope and R square values 306 of porosity sensitivity curves 302 for a porosity library model 224 are determined by software modeling when the ultrasonic properties of the composite materials are known.

In block 136, the slope of the porosity sensitivity curve 302 is adjusted to set libraries by an auto filter algorithm. For example, the lower frequencies in FIG. 4B are reduced until an optimum slope of the porosity sensitivity curve 302 in FIG. 3 is achieved. Greater sensitivity to porosity can be achieved by increasing the slopes of the metrology porosity curves 220 or porosity sensitivity curves through lower frequency filtering of the frequency response 226.

In block 138, a determination is made whether the porosity sensitivity 218 of the NDI ultrasonic system 202 has been validated. If the porosity sensitivity 218 of the NDI ultrasonic system 202 has been validated, the method 100 advances to block 140. In block 140, the NDI ultrasonic system 202 and/or the NDI ultrasonic transducer 204 has been qualified. In accordance with an example, a message is presented that the NDI ultrasonic system 202 and/or the NDI ultrasonic transducer 204 has been qualified.

If the NDI ultrasonic system 202 and/or the NDI ultrasonic transducer 204 has not been qualified, the method 100 returns to block 118. In block 118 at least one of the NDI ultrasonic system 202 or the NDI ultrasonic transducer 204 of the NDI ultrasonic system 202 are calibrated in response to the porosity sensitivity 218 of the NDI ultrasonic system 202 not being validated. The method 100 will then continue through blocks 102-120 similar to that previously described to determine whether the calibration of at least one of the NDI ultrasonic system 202 or NDI ultrasonic transducer 204 has affected qualification by the time-domain qualification mask 112. Accordingly, performing the ultrasonic scanning operation to generate a new scan signal 104 in block 102; verifying the new scan signal 104 passes the time-domain qualification mask 112 in blocks 110-120; validating the porosity sensitivity 218 using the frequency-domain qualification mask in block 122; and calibrating at least one of the NDI ultrasonic system 202 or the NDI ultrasonic transducer 204 in block 118 is repeated until the porosity sensitivity 218 of the NDI ultrasonic system 202 is validated in block 140.

In block 140, the NDI ultrasonic system 202 and/or the NDI ultrasonic transducer 204 is qualified in response to the porosity sensitivity 218 of the NDI ultrasonic system 202 being validated as described herein, and also in response to the scan signal 104 or new scan signal 104 being below the time-domain qualification mask 112 for any portion of the calibration coupon 217 without a defect 106 (FIG. 6) and the scan signal 104 or new scan signal 104 being above the time-domain qualification mask 112 for any other portion of the calibration coupon 217 including a defect 106, as previously described. The smart metrology system 200 is configured to generate an output including an indication that the NDI ultrasonic system 202 and/or the NDI ultrasonic transducer 204 is qualified in response to the porosity sensitivity 218 of the NDI ultrasonic system 202 being validated, where the output enables use and/or operation of the NDI ultrasonic system 202 and/or the NDI ultrasonic transducer 204 for inspection purposed.

Figure 5:
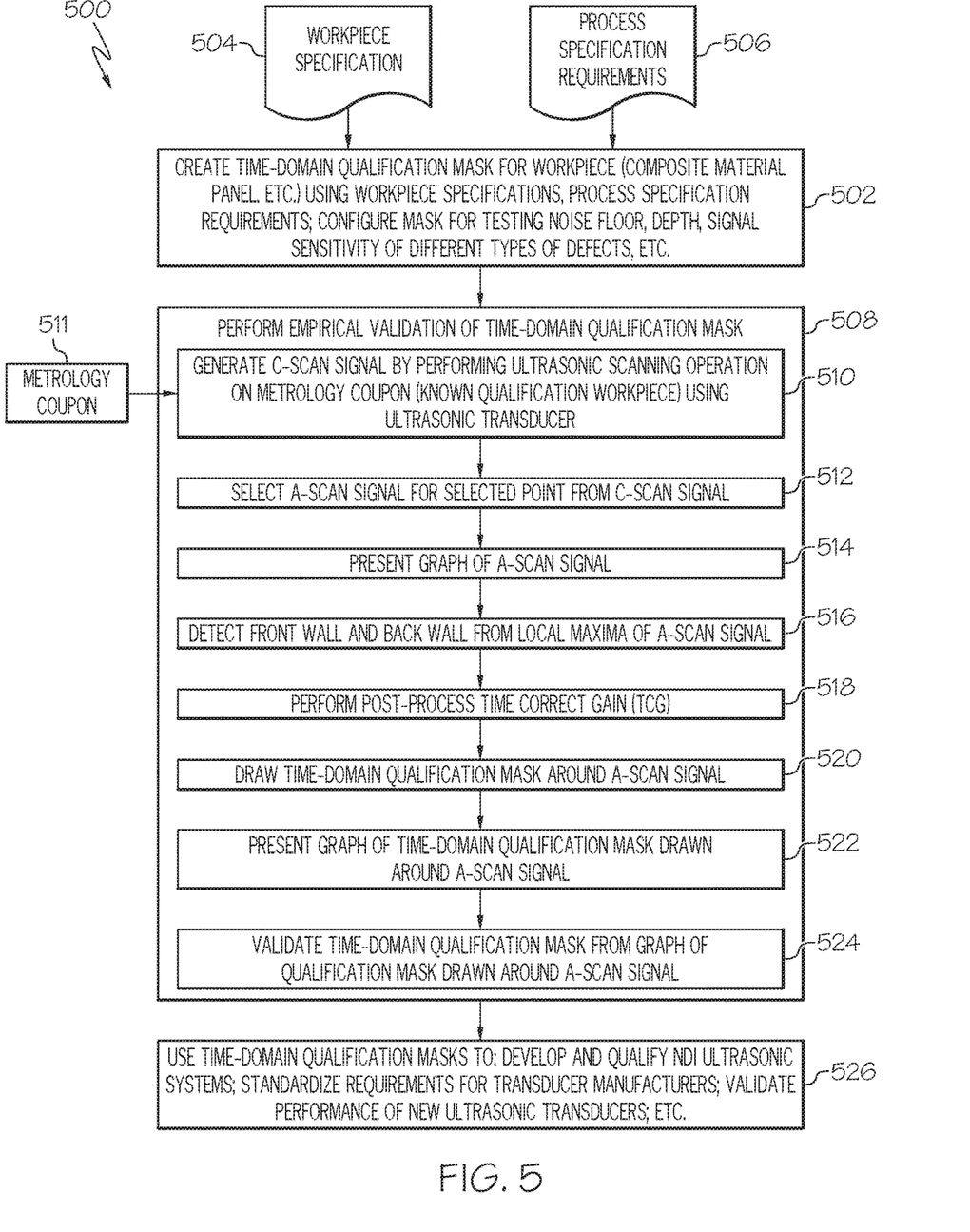
FIG. 5 is a flow chart of an example of a method for creating and performing validation of a time-domain qualification mask in accordance with an example of the present disclosure.

Referring to FIG. 5, FIG. 5 is a flow chart of an example of a method 500 for creating and performing validation of a time-domain qualification mask 112 in accordance with an example of the present disclosure. Referring also to FIG. 6, FIG. 6 is an illustration of an example of a time-domain qualification mask 112 in accordance with an example of the present disclosure. In block 502, the time-domain qualification mask 112 is created using at least one of a workpiece specification 504 and process specification requirements 506 for processing the workpiece 240 (FIG. 2). In accordance with an example, the workpiece 240 is a composite material panel including multiple layers of material similar to that previously described. However, the exemplary methods and systems described herein are applicable to any type of workpiece 240 and are not limited to components made of composite materials or any particular type of material or construction. The time-domain qualification mask 112 is configured for testing a noise floor 602 (FIG. 6), a depth of the calibration coupon 217, and a signal sensitivity for different types of defects 106 (FIG. 6). Examples of the different types of defects 106 include but are not necessarily limited to a void, a delamination, and an inclusion.

The time-domain qualification masks 112 includes horizontal breakpoints 606a-606c and vertical breakpoints 608a-608b. The time-domain qualification mask 112 can include a step segment, a slope segment with linear or curved segments, or a combination of any of these type segments. In the example in FIG. 6, the time-domain qualification mask 112 is a combination function of linear segments. Voltage $V_0$ equals an adjusted reference signal. $V_1$ equals a first breakpoint 606a. $V_2$ equals a second breakpoint 606b and $V_3$ equals a third breakpoint 606c. In the example in FIG. 6, the third breakpoint 606c is the noise floor 602. Time $T_0$ equals a front surface of a metrology coupon 511 at zero thickness for base reference. $T_1$ equals a first breakpoint 608a and $T_2$ equals a second breakpoint 608b.

In block 508 of FIG. 5, a validation of the time-domain qualification mask 112 is performed. In accordance with an example an empirical validation of the time-domain qualification mask 112 is performed. In accordance with an example, performing validation of the time-domain qualification mask 112 in block 508 includes the operations described with reference to blocks 510-524.

In block 510, a C-scan signal is generated by performing an ultrasonic scanning operation on a metrology coupon 511 using an NDI ultrasonic transducer, such as NDI ultrasonic transducer 204 in FIG. 2. In accordance with an example, the metrology coupon 511 corresponds to a qualification workpiece which is known to meet or satisfy the workpiece specification 504.

In block 512, an A-scan signal 104 (FIG. 6) is selected from the C-scan signal for a selected point. A-scan is a method of presenting ultrasonic signal data utilizing a horizontal baseline that indicates a distance, or time, and a vertical deflection from the baseline which indicates an amplitude of the return ultrasonic signal. C-scan is a method of presenting ultrasonic signal data which provides a plan view of a test object, such as a calibration coupon 217, metrology coupon 511 or workpiece 240, and discontinuities within the test object. In block 514, a graph of the A-scan signal is presented.

In block 516, a front wall 604 (FIG. 6) of the metrology coupon 511 and a back wall (not shown in FIG. 6) of the metrology coupon 511 are detected from local maxima of the A-scan signal 104. In block 518, post-process time correct gain (TCG) is performed. Post-process time correct gain is a process to add gain to a scan signal to normalize the natural attenuation of composite materials based on thickness. Time correct gain (TCG) compensates for gain as a function of time for differences in amplitude of reflections from equal reflectors, such as for example a defect 106, at different sound travel distances in a test object.

In block 520, the time-domain qualification mask 112 (FIG. 6) is drawn around the A-scan signal 104. The time-domain qualification mask 112 is represented by the cross-hatched area in FIG. 6.

In block 522, a graph of the time-domain qualification mask 112 drawn around the A-scan signal 104 is presents as illustrated in FIG. 6. In block 524, the time-domain qualification mask 112 is validated from the graph of the time-domain qualification mask 112 drawn around the A-scan signal 104.

In block 526, the time-domain qualification mask 112 is used to: develop and qualify NDI ultrasonic systems; standardize requirements for ultrasonic transducer manufacturers; validate performance of new ultrasonic transducers; etc.

Figure 7:
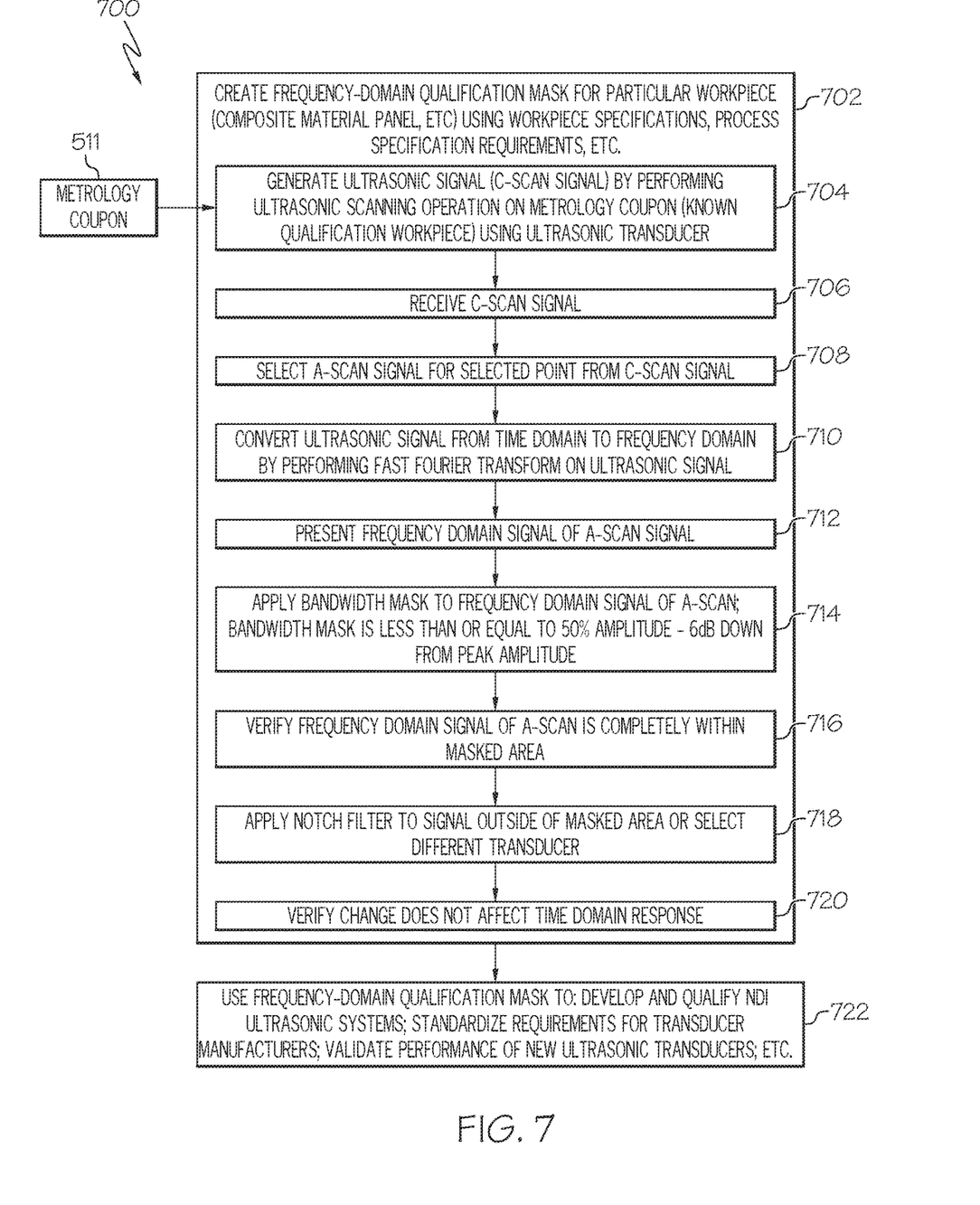
FIG. 7 is a flow chart of an example of a method for creating a frequency-domain qualification mask in accordance with an example of the present disclosure.

FIG. 7 is a flow chart of an example of a method 700 for creating a frequency-domain qualification mask 124 in accordance with an example of the present disclosure. Referring also to FIGS. 4A and 4B, FIG. 4A is an example of a frequency-domain qualification mask 124a for validating porosity sensitivity 218 of an NDI ultrasonic system 202 and/or an NDI ultrasonic transducer 204 before lower frequency component filtering in accordance with an example of the present disclosure. FIG. 4B is an example of a frequency-domain qualification mask 124b for validating porosity sensitivity 218 of an NDI ultrasonic system 202 and/or an NDI ultrasonic transducer 204 after lower frequency component filtering in accordance with an example of the present disclosure.

In block 702, a frequency-domain qualification mask 124 is created for a particular workpiece 240. In accordance with an example, the particular workpiece 240 is a composite material including multiple layers of laminated composite materials similar to that previously described. In accordance with other examples, frequency-domain qualification masks 124 can be created for other types of workpieces using the techniques described herein. In accordance with the example in FIG. 6, creating the frequency-domain qualification mask 124 in block 702 includes the operations described with reference to blocks 704-720.

In block 704, creating the frequency-domain qualification mask 124 for the particular workpiece 240 includes generating an ultrasonic scan signal by performing an ultrasonic scanning operation on a metrology coupon 511 using an NDI ultrasonic transducer of an NDI ultrasonic system, such as NDI ultrasonic system 202 in FIG. 2. As previously described, the metrology coupon 511 corresponds to a qualification workpiece 240 which is known to meet or satisfy the workpiece specification 504. In accordance with an example, the ultrasonic scan signal generated is a C-scan ultrasonic signal.

In block 706, the ultrasonic scan signal or C-scan ultrasonic signal is received by the NDI ultrasonic system 202. In block 708, the ultrasonic signal is converted from a time domain signal to a frequency domain signal 402 (FIGS. 4A and 4B). In accordance with an example, the ultrasonic scan signal is converted from the time domain to frequency domain by performing a Fast Fourier Transform (FFT) of the time domain ultrasonic scan signal.

In block 712, the frequency domain signal 402 of the ultrasonic scan signal or A-scan of the ultrasonic signal is presented. In accordance with an example, the frequency domain signal of the A-scan of the ultrasonic scan signal is presents on a display, such as display 214 in FIG. 2.

In block 714, a bandwidth mask 404 (FIGS. 4A and 4B) is applied that covers the frequency domain signal 402. In block 716, verifying that the frequency domain signal 402 is completely within the bandwidth mask 404 is performed.

In block 718, in accordance with an example, a notch filter is applied in the NDI ultrasonic system 202 (FIG. 2) or a different NDI ultrasonic transducer 204 is used so that the frequency domain signal 402 is completely within the bandwidth mask 404 in response to a portion of the frequency domain signal 402 being outside of the bandwidth mask 404. The bandwidth mask 404 completely covering the frequency domain signal 402 corresponds to the frequency-domain qualification mask 124. In accordance with an example, applying the bandwidth mask 404 includes the bandwidth mask 404 being less than or equal to about fifty percent (50%) of a peak amplitude of the frequency domain signal 402 or 6 decibels down from a peak amplitude of the time domain ultrasonic scan signal.

In block 720, a verification is performed that the change in block 718 does not affect the time domain response of the NDI ultrasonic system 202 and/or the NDI ultrasonic transducer 204. In accordance with an example, verifying that the change in block 718 does not affect the time domain response is performed the same as that described with respect to blocks 102-120 in FIG. 1A.

In block 722, the frequency-domain qualification mask 124 is used to: develop and qualify NDI ultrasonic systems; standardize requirements for NDI ultrasonic transducer manufacturers; validate performance of new NDI ultrasonic transducers; etc.

Referring back to FIG. 2, as previously discussed, FIG. 2 is an illustration of an example of a smart metrology system 200 for performing metrology qualification 201 of an NDI ultrasonic system 202 and/or an NDI ultrasonic transducer 204 in accordance with the exemplary method in FIGS. 1A and 1B. The smart metrology system 200 includes a processor 206 and a memory 208 associated with the processor 206. The memory 208 includes computer-readable program instructions 250 that, when executed by the processor 206 causes the processor 206 to perform a set of functions 252. In accordance with an example, the instructions 250 include instructions 250 to perform the methods described herein including metrology qualification 201 of an NDI ultrasonic systems 202 and/or an NDI ultrasonic transducers 204. In accordance with an example, the method 100 in FIGS. 2A and 2B, the method 500 in FIG. 5 and the method 700 in FIG. 7 are embodied in and performed by the smart metrology system 200 including the NDI ultrasonic system 202. The set of functions 252 include the blocks of method 100, method 500 and the method 700.

The flowchart and block diagrams in the Figures illustrate the architecture, functionality, and operation of possible implementations of systems, methods, and computer program products according to various examples of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular examples only and is not intended to be limiting of examples of the disclosure. As used herein, the singular forms "a", "an" and "the" are intended to include the plural forms as well, unless the context clearly indicates otherwise. It will be further understood that the terms "include," "includes," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present examples has been presented for purposes of illustration and description, but is not intended to be exhaustive or limited to examples in the form disclosed. Many modifications and variations will be apparent to those of ordinary skill in the art without departing from the scope and spirit of examples.

Although specific examples have been illustrated and described herein, those of ordinary skill in the art appreciate that any arrangement which is calculated to achieve the same purpose may be substituted for the specific examples shown and that the examples have other applications in other environments. This application is intended to cover any adaptations or variations. The following claims are in no way intended to limit the scope of examples of the disclosure to the specific examples described herein.

What is claimed is:

1. A method for performing metrology qualification of a non-destructive inspection (NDI) ultrasonic system and/or an NDI ultrasonic transducer, comprising:
    performing, by the NDI ultrasonic system, an ultrasonic scanning operation on a calibration coupon, the ultrasonic scanning operation generating a scan signal, wherein the NDI ultrasonic system comprises the NDI ultrasonic transducer;
    superimposing a time-domain qualification mask on the scan signal;
    evaluating the scan signal using the time-domain qualification mask;
    validating a porosity sensitivity of the NDI ultrasonic system and/or the NDI ultrasonic transducer using a frequency-domain qualification mask; and
    qualifying the NDI ultrasonic system and/or the NDI ultrasonic transducer in response to the scan signal being below the time-domain qualification mask for a portion of the calibration coupon without a defect and the scan signal being above the time-domain qualification mask for another portion of the calibration coupon comprising the defect, and the porosity sensitivity of the NDI ultrasonic system being validated.

2. The method of claim 1, further comprising:
    calibrating at least one of the NDI ultrasonic system or the NDI ultrasonic transducer in response to the scan signal being above the time-domain qualification mask for any of the portion of the calibration coupon without the defect or the scan signal being below the time-domain qualification mask for any of the other portion of the calibration coupon comprising the defect; and
    repeating: the performing the ultrasonic scanning operating to generate a new scan signal, the superimposing the time-domain qualification mask on the new scan signal, the evaluating the new scan signal using the time-domain qualification mask, and the at least one of calibrating the NDI ultrasonic system or the NDI ultrasonic transducer until the new scan signal is below the time-domain qualification mask for the portion of the calibration coupon without the defect and the new scan signal is above the time-domain qualification mask for the other portion of the calibration coupon comprising the defect.

3. The method of claim 1, further comprising:
    calibrating at least one of the NDI ultrasonic system or the NDI ultrasonic transducer in response to the porosity sensitivity of the NDI ultrasonic system not being validated; and
    repeating: the performing the ultrasonic scanning operation to generate a new scan signal, verifying the new scan signal passes the time-domain qualification mask, and the calibrating at least one of the NDI ultrasonic system or the NDI ultrasonic transducer until the porosity sensitivity of the NDI ultrasonic system is validated.

4. The method of claim 1, wherein the scan signal is an A-scan ultrasonic signal.

5. The method of claim 1, further comprising creating the time-domain qualification mask using at least one of a specification for a workpiece and process specification requirements, wherein the time-domain qualification mask is configured for testing a noise floor, a depth of the calibration coupon, and a signal sensitivity for different types of defects.

6. The method of claim 5, wherein the different types of defects comprise a void, a delamination, and an inclusion.

7. The method of claim 1, further comprising performing a validation of the time-domain qualification mask.

8. The method of claim 7, wherein performing the validation of the time-domain qualification mask comprises:
    generating a C-scan signal by performing an ultrasonic scanning operation on a metrology coupon;
    selecting an A-scan signal from the C-scan signal; and
    drawing the time-domain qualification mask around the A-scan signal.

9. The method of claim 1, wherein validating the porosity sensitivity of the NDI ultrasonic system and/or the NDI ultrasonic transducer comprises:
    predicting a system response of the NDI ultrasonic system by Fast Fourier Transform (FFT), dynamic range, and noise floor testing and evaluation;
    presenting a plurality of different material types for selection; and
    creating a porosity sensitivity curve for the selected material type using the frequency-domain qualification mask.

10. The method of claim 1, further comprising creating the frequency-domain qualification mask for a particular workpiece.

11. The method of claim 10, wherein creating the frequency-domain qualification mask for the particular workpiece comprises:
    generating an ultrasonic signal by performing an ultrasonic scanning operation on a metrology coupon;
    converting the ultrasonic signal from a time domain signal to a frequency domain signal; and
    applying a bandwidth mask that covers the frequency domain signal.

12. The method of claim 11, further comprising:
    verifying that the frequency domain signal is completely within the bandwidth mask; and
    applying a notch filter or using a different transducer so that the frequency domain signal is completely within the bandwidth mask in response to a portion of the frequency domain signal being outside of the bandwidth mask, wherein the bandwidth mask with the frequency domain signal completely within the bandwidth mask corresponds to the frequency-domain qualification mask.

13. The method of claim 11, wherein applying the bandwidth mask comprises the bandwidth mask being less than or equal to about fifty percent (50%) of a peak amplitude of the frequency domain signal.

14. The method of claim 1, wherein validating the porosity sensitivity of the NDI ultrasonic system is based on a thickness of the calibration coupon, a frequency of the NDI ultrasonic transducer and a bandwidth of a frequency domain signal.

15. A system for performing metrology qualification of a non-destructive inspection (NDI) ultrasonic system and/or an NDI ultrasonic transducer, comprising:
the NDI ultrasonic system, the NDI ultrasonic system comprising:
the NDI transducer;
a processor; and
a memory associated with the processor, the memory comprising computer-readable program instructions that, when executed by the processor causes the the NDI ultrasonic system to perform a set of functions comprising:
performing an ultrasonic scanning operation on a calibration coupon, the ultrasonic scanning operation generating a scan signal;
superimposing a time-domain qualification mask on the scan signal;
evaluating the scan signal using the time-domain qualification mask;
validating a porosity sensitivity of the NDI ultrasonic system using a frequency-domain qualification mask; and
qualifying the NDI ultrasonic system in response to the scan signal being within the time-domain qualification mask for a portion of the calibration coupon without a defect and the scan signal being above the time-domain qualification mask for another portion of the calibration coupon comprising the defect, and the porosity sensitivity of the NDI ultrasonic system being validated.

16. The system of claim 15, wherein the set of functions further comprise:
calibrating at least one of the NDI ultrasonic system or an NDI ultrasonic transducer in response to the scan signal being above the time-domain qualification mask for any of the portion of the calibration coupon without the defect or the scan signal being below the time-domain qualification mask for any of the other portion of the calibration coupon comprising the defect; and
repeating: the performing the ultrasonic scanning operating to generate a new scan signal, the superimposing the time-domain qualification mask on the new scan signal, the evaluating the new scan signal using the time-domain qualification mask, and the at least one of calibrating the NDI ultrasonic system or the NDI ultrasonic transducer until the new scan signal is below the time-domain qualification mask for the portion of the calibration coupon without the defect and the new scan signal is above the time-domain qualification mask for the other portion of the calibration coupon comprising the defect.

17. The system of claim 15, wherein the set of functions further comprise:
calibrating at least one of the NDI ultrasonic system or the NDI ultrasonic transducer in response to the porosity sensitivity of the NDI ultrasonic system not being validated; and
repeating: the performing the ultrasonic scanning operation to generate a new scan signal, verifying the new scan signal passes the time-domain qualification mask, and the calibrating at least one of the NDI ultrasonic system or the NDI ultrasonic transducer until the porosity sensitivity of the NDI ultrasonic system is validated.

18. The system of claim 15, wherein the set of functions further comprise creating the time-domain qualification mask using at least one of a specification for a workpiece and process specification requirements, wherein the time-domain qualification mask is configured for testing a noise floor, a depth of the calibration coupon, and a signal sensitivity for different types of defects.

19. The system of claim 18, wherein the different types of defects comprise a void, a delamination, and an inclusion.

20. The system of claim 15, wherein the set of functions further comprise creating the frequency-domain qualification mask for a particular workpiece, wherein creating the frequency-domain qualification mask for the particular workpiece comprises:
generating an ultrasonic signal by performing an ultrasonic scanning operation on a metrology coupon;
converting the ultrasonic signal from a time domain signal to a frequency domain signal; and
applying a bandwidth mask that covers the frequency domain signal.

* * * * *